July 7, 1925. 1,544,556
F. E. CHURCH
PLATFORM SCALE
Original Filed June 19, 1923  2 Sheets-Sheet 2
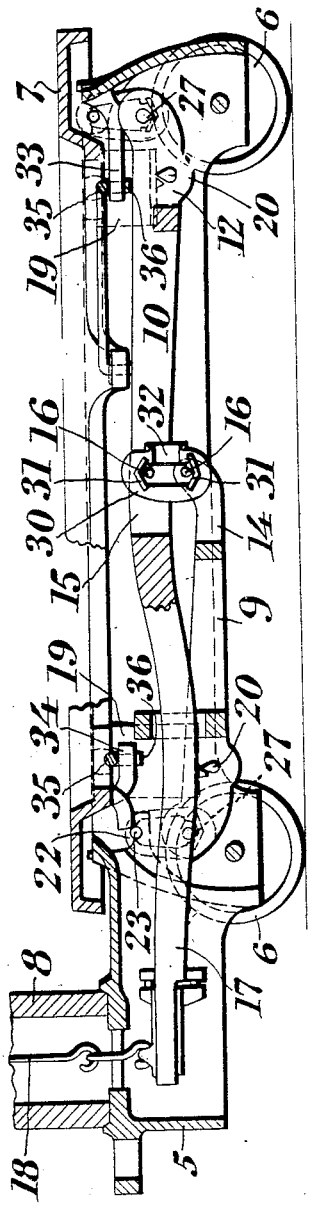
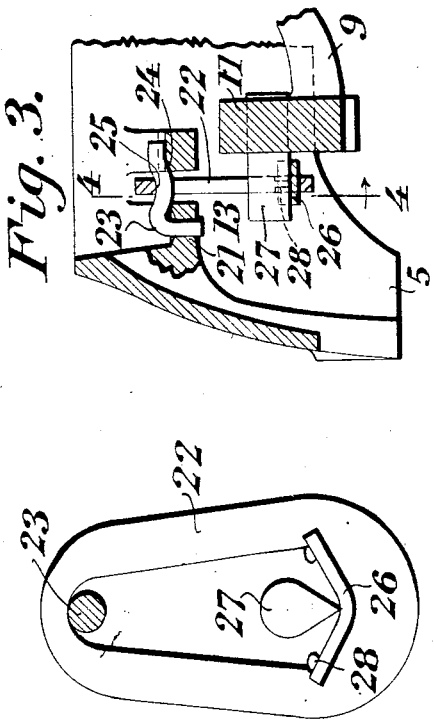
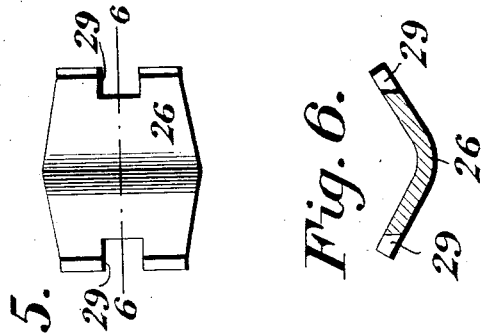
INVENTOR
Frank E. Church
BY
M. F. Garnett
ATTORNEY Patented July 7, 1925.

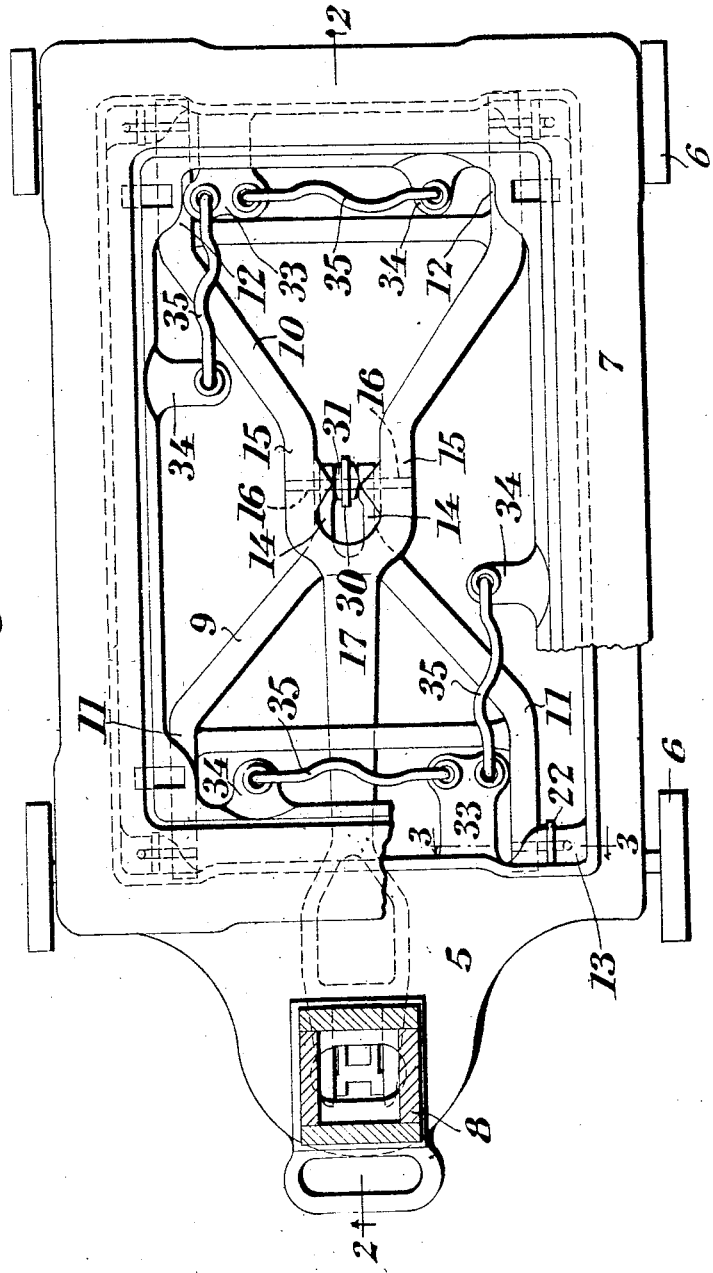

1,544,556

UNITED STATES PATENT OFFICE.

FRANK E. CHURCH, OF ST. JOHNSBURY, VERMONT, ASSIGNOR TO E. AND T. FAIRBANKS AND COMPANY, OF ST. JOHNSBURY, VERMONT, A CORPORATION OF VERMONT.

PLATFORM SCALE.

Original application filed June 19, 1923, Serial No. 646,289. Divided and this application filed June 9, 1924. Serial No. 718,710.

*To all whom it may concern:*

Be it known that I, FRANK E. CHURCH, a citizen of the United States of America, residing at St. Johnsbury, in the county of Caledonia and State of Vermont, have invented certain new and useful Improvements in Platform Scales, of which the following is a full, clear, and exact description, such as will enable others skilled in the art to which it appertains to make and use the same.

In my prior application filed June 19, 1923, Serial No. 646,289, I showed, described and claimed a portable platform scale embodying several new features of construction. The United States Patent Office has required a division of such application, and accordingly the present application is filed.

This invention relates to improvements in weighing scales, and more especially in some of its details to improvements in portable platform scales.

It is a general object of the invention to provide an improved scale of the class mentioned in which simplicity of construction, interchangeability of parts, ease of repair or replacement of parts, and economies in production cost are attained.

Another object of the invention is the provision of an improved scale in which refinement in construction is employed, resulting in enduring accuracy, and in which accuracy in operation is undisturbed by a slight disalignment of parts, either due to structural or assembling inaccuracies, or as a result of severe usage or accident.

A further object of the invention is to provide an improved pivot bearing for scales of simple and durable construction.

Still another object is to improve and perfect the elements, and assembly of elements in a scale, resulting in production and operating advantages.

Other objects will be in part obvious in connection with the following detailed description of an illustrative embodiment of the invention, and will be in part pointed out in connection therewith.

The invention accordingly comprises the features of construction, combination of elements, and arrangement of parts, which will be exemplified in the construction hereinafter set forth, and the scope of the application of which will be indicated in the claims.

For a complete understanding of the nature and objects of the invention, reference is had to the following detailed description and to the accompanying drawings, wherein—

Figure 1, is a plan view of a platform scale constructed in accordance with this invention, parts being broken away for clearness of disclosure;

Fig. 2, is a longitudinal vertical section through Fig. 1, approximately on the line 2—2 thereof;

Fig. 3, is a fragmentary section approximately on the irregular line 3—3 of Fig. 1, showing a suspension from one of the main levers;

Fig. 4, is a vertical section taken approximately on the line 4—4 of Fig. 3, and Figs. 5 and 6 are detail views of the bearing plate.

Referring now to the drawing for a detailed description of the embodiment of the invention there shown, the scale comprises a base frame 5, preferably provided with trucks 6, for rendering the scale easily portable. A load receiving platform 7 is supported to lie in a plane above the base frame member, and adjacent the forward end thereof is an upstanding column 8 for housing the load transmitting rod and other operating parts of the scale, and for supporting the weigh-beam of the scale (not shown).

The main scale levers 9, 10 are mounted in the base frame member, being preferably of cast metal, and having longitudinally inclined side members and transverse connection members therefor. The side members at the outer ends thereof merge into parallel extensions 11, 12, to which the main or corner supporting bearings 13 are connected. The main levers extend from the main bearings 13 toward each other, the sides converging and the levers meeting near the center of the base frame member, where spaced parallel frame members 14 are provided in the lever 9, and similar opposed spaced parallel frame members 15 are provided in the lever 10. These spaced parallel members 14 and 15 provide opposed walls for the support of pivot bearings 16, for the center connection of the levers. The pivot bearings 16 are supported at both ends in the opposed walls, providing a secure and rigid support and preventing bending or other displacement incident to severe usage, or to other causes. The lever 10 is provided, beyond the center connection, with an extension 17, for transmitting the weighing stresses through the connected transmission rod 18 to the weigh-beam (not shown). As will be seen in Fig. 2, the platform is supported by blocks 19 carried on knife edge bearings 20 on the main scale levers.

The main or corner bearings 13 for the main levers are preferably of similar construction, and are of special improved design, permitting easy assembly, or disassembly, and moreover being adapted to assume proper alignment when assembled, and to retain such alignment under wear and severe service conditions.

As shown in Fig. 3, this bearing comprises lugs 21, preferably formed integrally with the base frame member, and having spaced supporting parts providing an opening therebetween for the reception of the bearing link or loop 22. The loop is supported on the lug 21 by means of a pin 23, having a laterally projecting part for engagement in an opening in the lug to hold the pin in position. A depression 24 in the upper face of the lug 21 provides a seat to further insure the retention of the pin in proper supporting position.

The supporting pin is preferably provided with a depression 25 in its upper face, centered with the link receiving opening, and adapted for the reception of the link to insure proper positioning thereof. The loop is preferably provided with a bearing plate 26 seated therein and adapted to engage with a pivot bearing 27 suitably supported in the extension 11 of the lever. The bearing plate 26 is loosely seated in the link, and is substantially V-shaped in end elevation, forming an angular seat for the pivot bearing 27. The bearing plate is seated in a correspondingly shaped seat formed in the supporting link, being secured in position by lugs 28 overlying the plate and formed integral with the loop 22. If so desired the lugs are struck up from the loop after the bearing plate is placed in position.

As shown, the bearing plate is notched at the sides thereof, as indicated at 29, for the reception of the sides of the loop adjacent the bearing seat, so as to prevent the bearing plate from sliding longitudinally out of its seat. The notches 29 are wide enough so the edges thereof engage loosely with the sides of the link and the retaining lugs 28 are spaced sufficiently above the edge of the bearing plate to permit freedom of rocking movement, so the plate automatically adjusts itself to the proper position for contacting with the pivot pin. In this manner the bearing is self-compensating and parts thereof will always be properly aligned irrespective of inaccuracies in the proportion of parts and assembly thereof, and this alignment will be retained irrespective of severe usage or wear. The seat of the bearing plate in the loop being quite narrow readily permits slight rocking movements of the bearing therein.

An inexpensive and convenient method of producing the bearing above described has been devised, being substantially as follows:—Bars of steel of substantially the cross-sectional shape of the bearing, that is, in the embodiment shown, substantially V-shaped, are provided, and lengths are cut therefrom corresponding to the bearing length desired. These several lengths are then punched at the lateral edges thereof to provide the notches 29, and the angular or V-shaped bearing surface may be smoothed or otherwise conditioned as by grinding. The plate as thus formed is placed in its supporting seat, as in the seat provided in the loop 22, and the integral lugs 28 then struck up from the adjacent metal, as by punching together the metal at the opposite sides of the loop, with an appropriate tool, or by punching.

The center connection or suspension for the main scale levers is preferably constructed in such a way as to permit it to be readily placed in position or removed, and to be locked in position when the scale is sealed or adjusted for correct weighing. As shown, this connection preferably comprises a connecting link 30 having an opening for the reception of the self-compensating bearing plates 31, for pivotal engagement with the pivot bearings 16, which are anchored in the levers 9 and 10 as above described. The link is provided with an open side, forming a passageway to the interior opening, whereby the link is placed in operative position or removed. This passageway may be closed by a sheet metal locking plate 32.

An improved checking arrangement is provided whereby the main scale levers and load receiving platform are held in properly centered position. As shown, this checking system preferably includes check lugs 33 at the opposite ends of the base frame, each having two spaced vertically disposed openings therein, these lugs preferably being formed integrally with the base frame.

Similarly formed check lugs 34, preferably four in number, disposed on the four sides of the platform, are spaced from the lugs 33, having also vertically disposed openings therein. The lugs 33 lie approximately in the same horizontal plane with the corresponding lugs 34. Check rods 35 are provided with angularly disposed projections 36 for reception in the vertical openings of the check lugs. When the check rods are assembled with the spaced projections 36 seated in the corresponding check lugs, as shown in Fig. 1, the platform and main scale levers will be checked in correctly centered position in all directions.

From the foregoing it will be seen that assembly or disassembly of the various elements is provided for and repair and replacement of the parts facilitated.

Since certain changes may be made in the above construction and different embodiments of the invention could be made without departing from the scope thereof, it is intended that all matter contained in the above description, or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. In a scale, the combination with spaced supporting parts, and a scale lever adapted to be supported from said parts, of supporting links for said lever, and detachable pins spanning the spaced parts for supporting the links.

2. In a scale, the combination with spaced supporting parts, including a lug having an aperture formed therein, and a scale lever adapted to be supported from said parts, of supporting links for said lever, and a supporting pin for each link, said pin resting on said spaced parts and having an angularly disposed projection extending into said aperture.

3. In a scale, the combination with spaced supporting parts, and a scale lever adapted to be supported from said parts, of supporting links for said lever, and a supporting pin for each link, said pin resting on said spaced parts and having a depression in the upper part thereof for the reception of said link.

4. In a scale, the combination with spaced supporting parts, including a lug having an aperture formed therein, and a scale lever adapted to be supported from said parts, of supporting links for said lever, and a supporting pin for each link, resting on said spaced parts, said pin having an angularly disposed projection extending in said aperture, and a depression in the upper part thereof for the reception of said link.

5. In a scale, the combination with a base frame having a lug provided with an aperture, and a scale lever, of a supporting link for said scale lever, and a supporting pin for said link, said pin having an angularly disposed projection extending into said aperture.

6. In a scale, the combination with a base frame, supporting lugs on said frame having spaced supporting parts and apertures formed in said lugs, and a scale lever, of supporting links for said lever, each link having pivotal connection with said lever and extending between said spaced supporting parts, and a supporting pin for each of said links, said pin resting on said spaced parts and having an angularly disposed projection extending into said aperture.

7. In a scale, the combination with a base frame, supporting lugs on said frame having spaced supporting parts, and apertures formed in said lugs, and a scale lever, of supporting links for said lever, each link having a compensating bearing providing for a pivotal connection with said lever, said links extending between said spaced supporting parts, and a supporting pin for each of said links, said pin resting on said spaced parts and having an angularly disposed projection extending into the said aperture.

8. In a scale, the combination with a base frame, supporting lugs on said frame having spaced supporting parts and an aperture formed in said lugs, and a scale lever, of supporting links for said lever, each link having a compensating bearing providing for a pivotal connection with said lever, said links extending between said spaced supporting parts, and a supporting pin for each of said links, said pin resting on said spaced parts and having a depression in the upper part thereof for the reception of said link, and an angularly disposed projection extending into the said aperture.

9. In a scale, the combination with spaced supporting parts, and a scale lever adapted to be supported from said spaced parts, of supporting links for said lever, each having a compensating bearing providing a pivotal connection with said lever, and a supporting pin for said link.

In testimony whereof I hereunto sign my name.

FRANK E. CHURCH.